(12) United States Patent
Pryor

(10) Patent No.: US 11,447,970 B2
(45) Date of Patent: Sep. 20, 2022

(54) PINNED BASE CONNECTION FOR A STRUCTURAL MEMBER

(71) Applicant: Simpson Strong-Tie Company Inc., Pleasanton, CA (US)

(72) Inventor: Steven E. Pryor, Dublin, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 16/984,325

(22) Filed: Aug. 4, 2020

(65) Prior Publication Data
US 2022/0042272 A1    Feb. 10, 2022

(51) Int. Cl.
*E04H 9/02* (2006.01)
*E02D 27/34* (2006.01)
*E02D 27/50* (2006.01)
*E02D 27/42* (2006.01)

(52) U.S. Cl.
CPC .......... *E04H 9/021* (2013.01); *E02D 27/34* (2013.01); *E02D 27/50* (2013.01); *E02D 27/42* (2013.01); *E02D 2200/1642* (2013.01); *E02D 2600/20* (2013.01)

(58) Field of Classification Search
CPC ....... E04H 9/021; E04H 9/0215; E04H 9/027; E04B 2001/268
USPC .............................................. 52/167.4, 167.6
See application file for complete search history.

(56) References Cited

U.S. PATENT DOCUMENTS

| | | | | |
|---|---|---|---|---|
| 3,762,114 A | * | 10/1973 | Eskijian | E04H 9/023 52/167.4 |
| 5,062,730 A | * | 11/1991 | Tomii | F16D 3/40 403/57 |
| 6,085,473 A | * | 7/2000 | Teramachi | E04H 9/023 52/167.1 |
| 6,324,795 B1 | | 12/2001 | Stiles et al. | |
| 7,338,035 B2 | * | 3/2008 | Tsai | E02D 27/34 267/136 |

(Continued)

FOREIGN PATENT DOCUMENTS

| | | | | |
|---|---|---|---|---|
| CN | 110388115 A | * | 10/2019 | |
| DE | 102010019659 A1 | * | 11/2011 | E04H 9/023 |

(Continued)

OTHER PUBLICATIONS

International Search Report & Written Opinion dated Feb. 25, 2022 in International Application No. PCT/US2021/042525.

(Continued)

*Primary Examiner* — Frederick L Lagman
(74) *Attorney, Agent, or Firm* — Vierra Magen Marcus LLP

(57) ABSTRACT

A pinned base connector affixing a structural member to a foundation at one or more levels of a construction. The pinned base connector includes a baseplate affixed to the foundation. A column support plate is affixed to the baseplate via a pivot block. The pivot block is affixed to the baseplate to allow rotation of the pivot block relative to the baseplate about a first axis. The column support plate is affixed to the pivot block to allow rotation of the column support plate relative to the pivot block about a second axis orthogonal to the first. A column or other structural member may then be affixed to a surface of the column support plate.

20 Claims, 14 Drawing Sheets

(56) References Cited

U.S. PATENT DOCUMENTS

| | | | |
|---|---|---|---|
| 7,472,518 B2* | 1/2009 | Tsai | E04H 9/023 248/562 |
| 8,333,526 B2* | 12/2012 | Long | F16D 3/40 403/57 |
| 9,175,467 B2 | 11/2015 | Kienholz et al. | |
| 10,024,074 B1* | 7/2018 | Stevig | E04H 9/023 |
| 2002/0166296 A1* | 11/2002 | Kim | E04H 9/023 52/167.5 |
| 2005/0257451 A1* | 11/2005 | Pryor | E04B 1/36 52/167.4 |
| 2006/0000159 A1* | 1/2006 | Tsai | E04H 9/023 52/167.4 |
| 2011/0227265 A1* | 9/2011 | Fujita | E04H 9/021 267/140.13 |
| 2012/0096779 A1* | 4/2012 | Tsai | E04H 9/023 52/167.4 |
| 2014/0115979 A1 | 5/2014 | Kenho | |
| 2016/0298352 A1* | 10/2016 | Agha Beigi | E04H 9/027 |
| 2017/0138043 A1* | 5/2017 | Pryor | E04H 9/021 |
| 2018/0142489 A1* | 5/2018 | Becci | E04H 9/021 |
| 2019/0338547 A1* | 11/2019 | Almaz N Campillay | E02D 5/74 |

FOREIGN PATENT DOCUMENTS

| | | | | |
|---|---|---|---|---|
| FR | 2738861 | | 3/1997 | |
| IT | MS20120004 | | 4/2014 | |
| KR | 20070090053 | | 9/2007 | |
| WO | WO-9525865 A1 * | 9/1995 | | E04H 9/0237 |
| WO | WO-2018100499 A1 * | 6/2018 | | F16F 7/12 |
| WO | WO-2018219451 A1 * | 12/2018 | | H02B 1/54 |

OTHER PUBLICATIONS

English language Abstract for KR20070090053 published Sep. 5, 2007.

English language Bibliogrpahic data for ITMS20120004 published Apr. 30, 2014.

English language Abstract for FR2738861 published Mar. 21, 1997.

* cited by examiner

PINNED BASE CONNECTION FOR A STRUCTURAL MEMBER

BACKGROUND OF THE INVENTION

Field of the Invention

The present invention is directed to an improved construction device, and specifically an improved pinned connection at a base of structural members.

Description of the Related Art

Shear stresses due to natural phenomena such as seismic activity and high winds can have devastating effects on the structural integrity of framed constructions. Lateral forces generated during such natural phenomena may cause the top portion of a wall to move laterally with respect to the bottom portion of the wall, which movement can result in damage or structural failure of the wall and, in some instances, collapse of the building.

In constructions such as residences and small buildings, lateral bracing systems have been developed to counteract the potentially devastating effects of shear stress on the structural integrity of light-framed constructions. Although various designs are known, one type of lateral bracing system includes vertical columns mounted to a foundation, and horizontal beams affixed to and extending between the columns.

Where the columns are rigidly affixed to the foundation, loads exerted on the columns, either from the foundation or shear loads on the construction, can generate excessive loads on the columns. These excessive loads can result in damage to the columns and/or foundation and possible failure of the columns.

SUMMARY OF THE INVENTION

The present technology, roughly described, relates to a column or other structural member supported on a foundation by a pinned base. The pinned base is configured to allow rotation of the structural member with two degrees of freedom relative to the foundation, thus allowing full 360° orbiting of a top portion of the structural member relative to a home axis of the structural member. The pinned connection effectively transfers axial loads on the structural member to the foundation, while effectively reducing or preventing moment forces from being transferred between the structural member and foundation.

In one example, the present technology relates to a system for securing a structural member to a foundation in a construction, comprising: a baseplate configured to be affixed to the foundation; a pivot block rotationally mounted to the baseplate for rotation about a first axis relative to the baseplate; a column support plate configured to support the structural member, the column support plate rotationally mounted to the pivot block for rotation about a second axis orthogonal to the first axis; and a fastener configured to fasten the structural member to the column support plate.

In a further example, the present technology relates to a construction comprising one or more levels, the construction comprising: a panel on a level of the one or more levels, the panel providing lateral, tensile and compressive stability to the construction; a structural member; a pinned connector supporting the structural member on a foundation of the level, the pinned connector allowing orbiting of the structural member 360° about a home axis, the structural member and pinned connector providing tensile and compressive stability to the construction.

In another example, the present technology relates to a construction comprising multiple levels, the construction comprising: a first panel on a first level of the multiple levels, the first panel providing lateral, tensile and compressive stability to the construction; a first structural member on the first level; a first pinned connector supporting the first structural member on a first foundation of the first level, the first pinned connector allowing orbiting of the first structural member 360° about a home axis, the first structural member and first pinned connector providing tensile and compressive stability to the construction; a second structural member on a second level of the multiple levels; and a second pinned connector affixed over the first structural member, the second pinned connector supporting the second structural member on a second foundation of the second level, the second pinned connector allowing orbiting of the second structural member 360° about a home axis, the second structural member and second pinned connector providing tensile and compressive stability to the construction.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
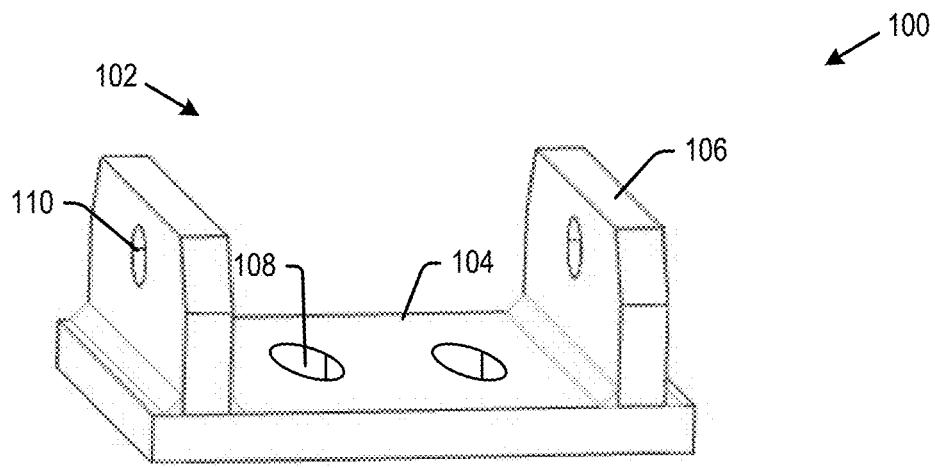
FIG. 1 depicts a perspective view of a baseplate of a pinned connector in accordance with embodiments of the present technology.

The present technology will now be described with reference to the figures, which in general relate to a construction including structural members affixed to a foundation at one or more levels using a pinned base connector. The pinned base connector comprises a baseplate affixed to the foundation or subsequent level. A column support plate is affixed to the baseplate via a pivot block. The pivot block is affixed to the baseplate to allow rotation of the pivot block relative to the baseplate about a first axis. The column support plate is affixed to the pivot block to allow rotation of the column support plate relative to the pivot block about a second axis orthogonal to the first. A column or other structural member may then be affixed to a surface of the column support plate.

The pivotal mounting of the column support plate about two orthogonal axes relative to the baseplate defines two degrees of freedom of the column support plate relative to the baseplate. These two degrees of freedom allow the structural member affixed to the column support plate to orbit a small amount about 360° around a home axis which may be perpendicular to baseplate. Thus, the pinned connector prevents transfer of moment, or rotational, forces from the foundation to the structural member, and vice-versa.

In embodiments, the pinned connector may be used in wood structures where for example the structural member is a wooden column. However, it is understood that the structural member affixed to the pinned connector may be any of a wide variety of other members used in a light-framed construction. Such members further include joists, studs, girders, chords, trusses, shear walls and frames. The pinned structural member may be formed of natural lumber in embodiments, such as for example sawn lumber from lumber groups including spruce-pine-fir, Douglas fir-larch, hem-fir and southern pine. However, the pinned structural member may be engineered lumber, such as glulam or wood composites, or metal in further embodiments. The pinned structural member may generally be vertical in the light framed construction, though it need not be in further embodiments.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±2.5%.

FIG. 1 is a perspective view of a baseplate 102 of a pinned connector 100 according to embodiments of the present technology. The baseplate 102 may comprise a base 104 having a pair of brackets 106 mounted at opposed edges of the base 104. The brackets 106 may be welded to the base 104, but may be affixed by other methods as by bolting and epoxy in further embodiments. The baseplate 102 may be cast as a single piece in further embodiments. The base 104 includes mounting holes 108, and the brackets 106 may each include mounting holes 110 axially aligned with each other.

The base 104 and/or brackets 106 may be ½" to 1" thick steel, such as for example ASTM A572 Grade 50 plate. Other steel plates and other thicknesses may be used, depending for example on the loads to be supported by the pinned connector 100. The mounting holes 108, 110 may be sized to receive 1.25" diameter bolts with a ¹⁄₁₆" or ¹⁄₃₂" clearance. The mounting holes 108, 110 may be sized to receive other diameter bolts with other clearances in further embodiments.

Figure 2:
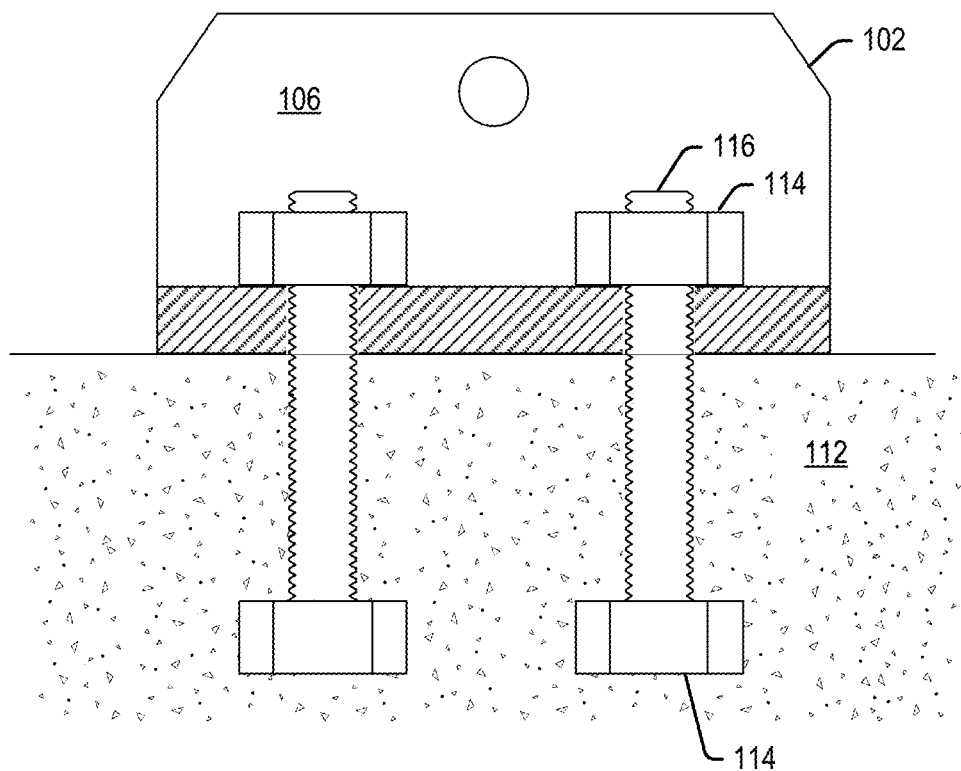
FIG. 2 depicts a front cross-sectional view of a baseplate of a pinned connector mounted to a foundation in accordance with embodiments of the present technology.

FIG. 2 is a cross-sectional view through the base 104 showing the baseplate 102 mounted to a foundation 112 via nuts 114 and bolts 116. The foundation 112 may for example be concrete. In such embodiments, the bolts 116 may be positioned within the concrete as it sets, and the baseplate 102 may be mounted to the bolts 116 thereafter. While a pair of bolts 116 are shown, there may be a single bolt or more than two bolts, in various patterns, in further embodiments. The baseplate 102 may be mounted to the foundation by other mechanisms in further embodiments. One such further embodiment includes some form of headed stud, such as a Nelson stud from Stanley Engineered Fastening, having an office in Giessen, Germany. Such as headed stud may be welded to the underside of plate 104 so that the entire unit 102 is cast into the wet concrete, the bottom surface of 104 being flush with the surface of the concrete.

Moreover, as explained below, the pinned connector 100 may be used on levels of a construction in addition to (or instead of) the bottommost level. In such embodiments, a structural member having a pinned connector at its base may be affixed directly atop a lower level structural member, or affixed to a floor plate of the additional level(s).

Figure 3:
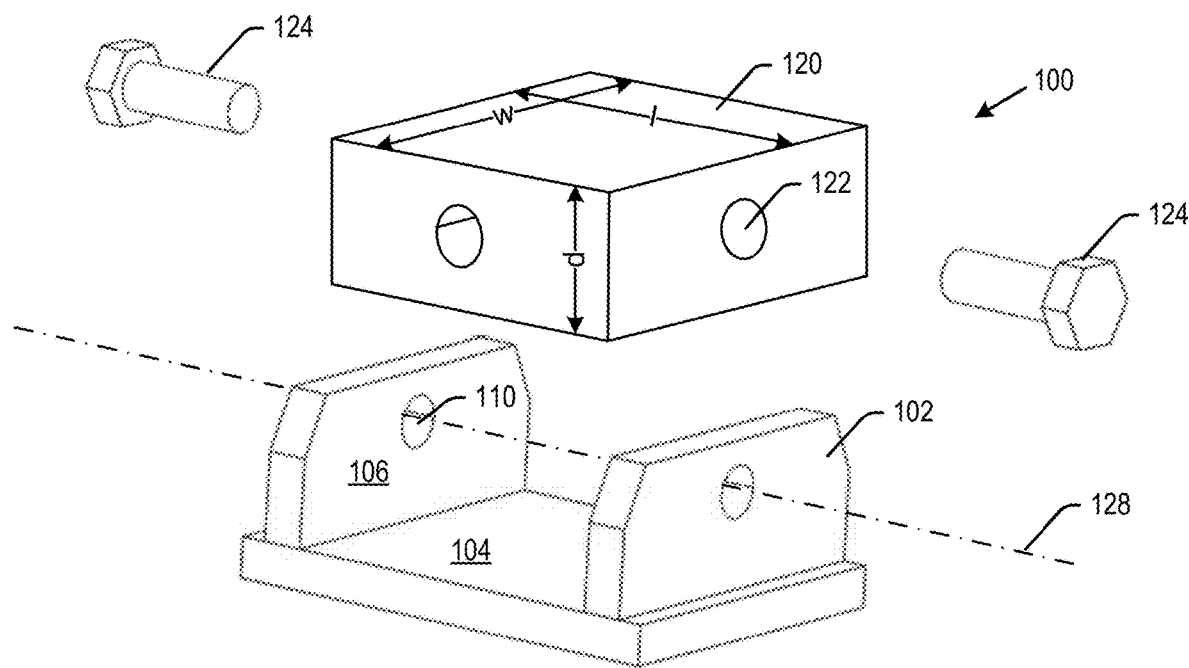
FIG. 3 depicts an exploded perspective view of a pivot block and baseplate of a pinned connector in accordance with embodiments of the present technology.
Figure 4:
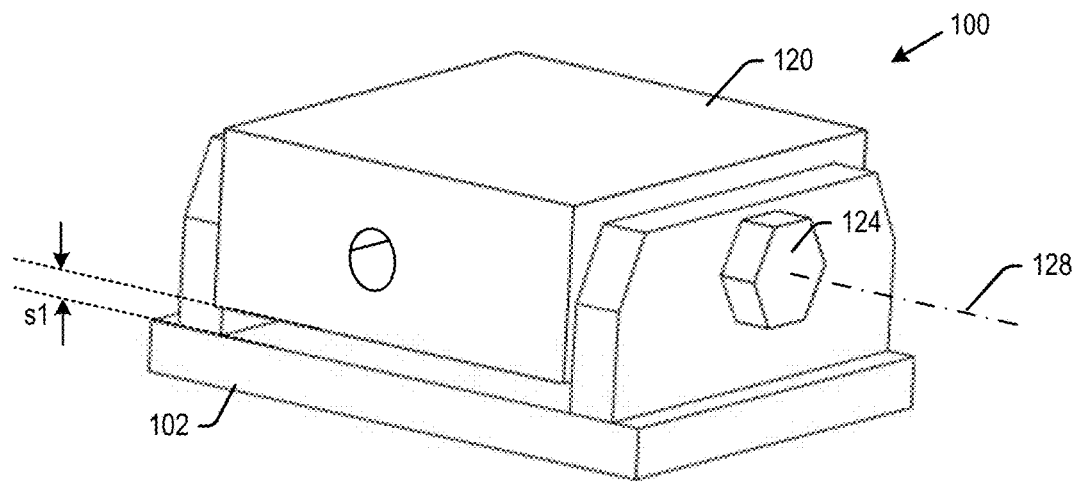
FIG. 4 depicts a perspective view of a pivot block pivotally connected by a first pair of bolts to a baseplate of a pinned connector in accordance with embodiments of the present technology.

FIGS. 3 and 4 are exploded perspective and perspective views, respectively, showing a pivot block 120 that is rotationally mounted to the baseplate 102. The pivot block 120 includes a first pair of mounting holes 122 (one of which is seen in FIG. 3). Mounting holes 122 are aligned with each other and mounting holes 110. Bolts 124 fit through mounting holes 110 in baseplate 102 and into mounting holes 122 to mount the pivot block 120 to the baseplate 102 for rotation about axis 128. The pivot block 120 may be formed of steel such as for example ASTM A36 steel, though other materials may be used.

Figure 8:
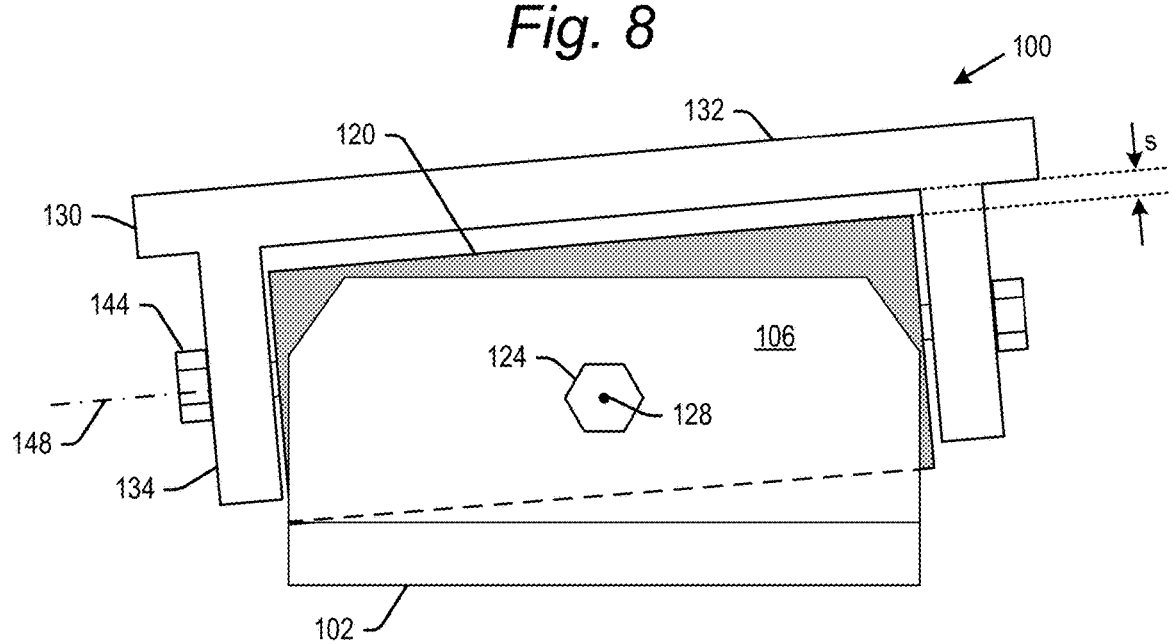
FIG. 8 depicts a front view of a completed pinned connector pivoted to a full extent about a first axis in accordance with embodiments of the present technology.

The pivot block 120 includes a length, l, sized to fit between the brackets 106 of the baseplate 102 with a slight clearance, such as for example ¼" to ¹⁄₁₆", though other clearances may be provided in further embodiments. The mounting holes 122 are provided along a depth dimension, d, of the pivot block 120 so as to leave a space, s1, between a bottom of the pivot block 120 and the base 104 when the pivot block 120 is mounted to the baseplate 102 and parallel to base 104. This space, s, together with a width dimension, w, of the pivot block 120, defines the maximum angle to which the pivot block 120 may rotate within baseplate 102. FIG. 8 illustrates this maximum angle. In embodiments, this angle may be ±3° about the axis 128, though the angle may be greater or lesser than that in further embodiments.

Figure 5:
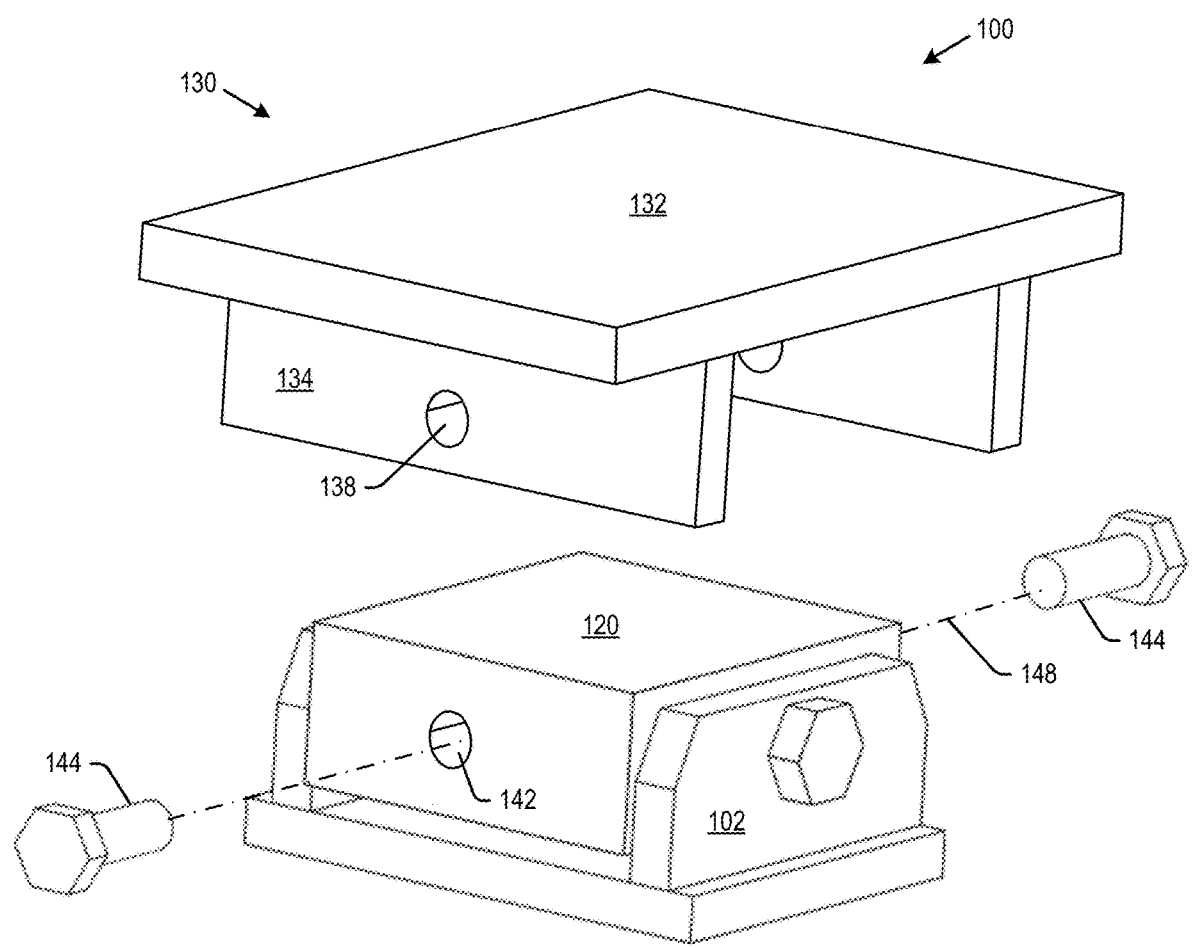
FIG. 5 depicts an exploded perspective view of a column support plate and pivot block/baseplate assembly in accordance with embodiments of the present technology.
Figure 6:
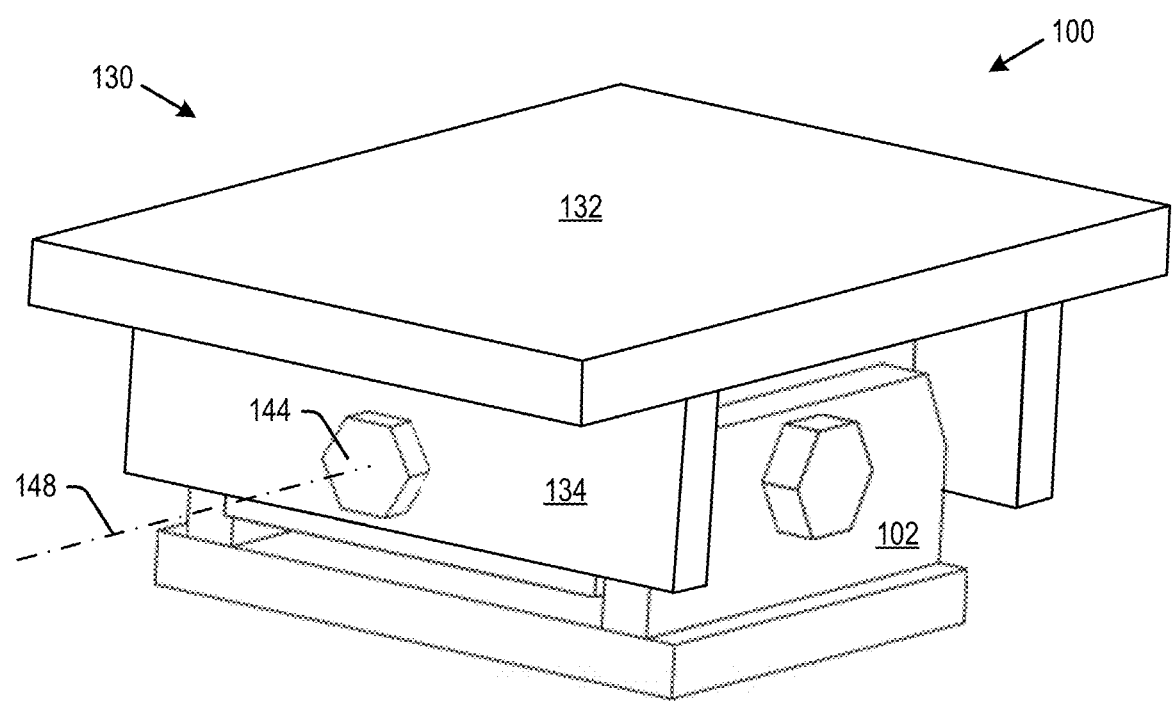
FIG. 6 depicts a perspective view of a completed pinned connector comprising a column support plate pivotally affixed to a pivot block/baseplate assembly by a second pair of bolts in accordance with embodiments of the present technology.

FIGS. 5 and 6 are exploded perspective and perspective views, respectively, showing a column support plate 130 that is rotationally mounted to the pivot block 120. While referred to as a 'column support plate,' it is understood that the plate 130 is not limited to supporting columns. The columns support plate 130 is provided for supporting any of the structural members 150 described herein.

The column support plate 130 includes a top plate 132 and a pair of brackets 134. The brackets 134 may be welded to the top plate 132, but may be affixed by other methods as by bolting and epoxy in further embodiments. The column support plate 130 may be cast as a single piece in further embodiments. The brackets 134 are spaced apart from each other to fit over the width dimension of the pivot block 120 with a small clearance, such as for example ¼" to ¹⁄₁₆", though other clearances are possible. The brackets 134 include mounting holes 138 axially aligned with each other.

The top plate 132 and/or brackets 134 may be ½" to 1" thick steel, such as for example ASTM A572 Grade 50 plate. Other steel plates and other thicknesses may be used, depending for example on the loads to be supported by the pinned connector 100. The mounting holes 138 may be sized to receive 1.25" diameter bolts with a ¹⁄₁₆" or ¹⁄₃₂" clearance. The mounting holes 138 may be sized to receive other diameter bolts with other clearances in further embodiments.

The pivot block 120 further includes a second pair of mounting holes 142 (one of which is seen in FIG. 5). Mounting holes 142 are aligned with each other and mounting holes 138. Bolts 144 fit through mounting holes 138 in column support plate 130 and into mounting holes 142 to mount the column support plate 130 to the pivot block for rotation about axis 148.

Figure 7:
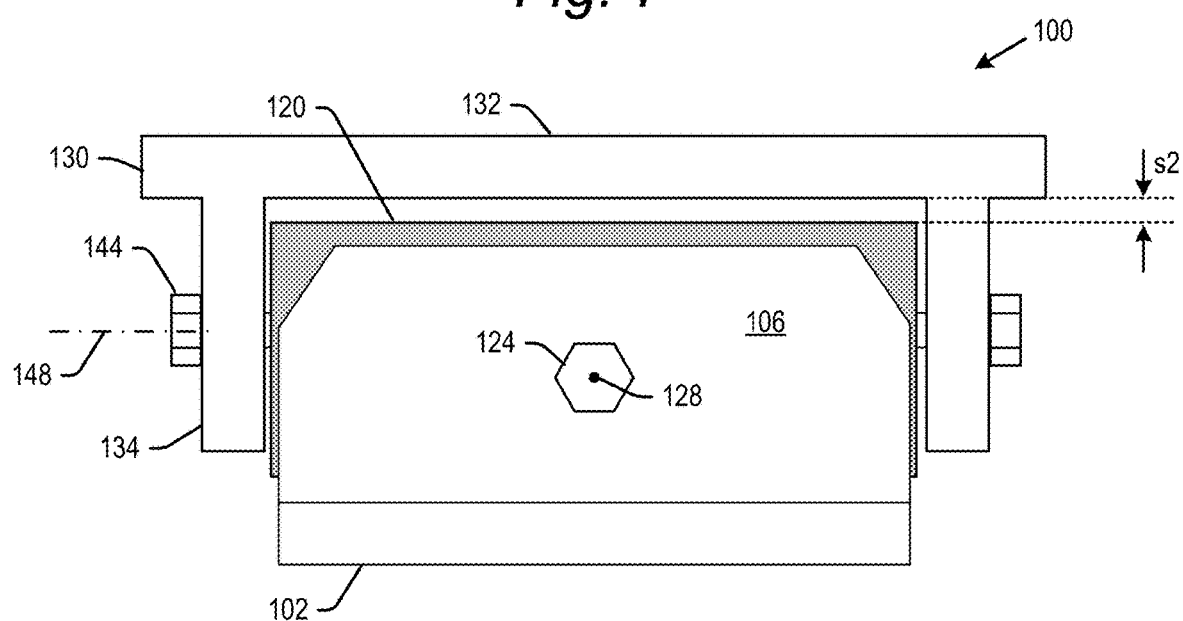
FIG. 7 depicts a front view of a completed pinned connector in accordance with embodiments of the present technology.

Referring now to the front view of FIG. 7, the bolts 144 are provided through the brackets 134 and into the pivot block 120 (shaded in FIG. 7) so as to leave a space, s2, between a top of the pivot block 120 and the top plate 132 when the top plate 132 is parallel to the pivot block 120. This space, s2, together with a length dimension of the pivot block 120, defines the maximum angle to which the column support plate 130 may rotate relative to the pivot block 120 about axis 148. In embodiments, this angle may be ±3° about the axis 148, though the angle may be greater or lesser than that in further embodiments. The spacing S2 may be the same as or different from the spacing S1 mentioned above.

FIG. 8 shows is a front view of the pinned connector 100 with the pivot block 120 and column support plate 130 rotated to their full extent about the first axis defined by bolts 124. As indicated by the dashed line indicating the bottom surface of the pivot block 120, the pivot block 120 abuts against the base 104 of baseplate 102 to prevent further rotation of the pivot block 120.

It is noteworthy that the top surface of the pivot block 120 may extend slightly above a top edge of the brackets 106 of the baseplate 102 from the front view shown in FIGS. 7 and 8. Thus, when the pivot block 120 and column support plate 130 rotated to their full extent as shown in FIG. 8, the pivot block 120 (and not the brackets 106) still defines the maximum extent by which the column support plate 130 may rotate about axis 148.

Figure 9:
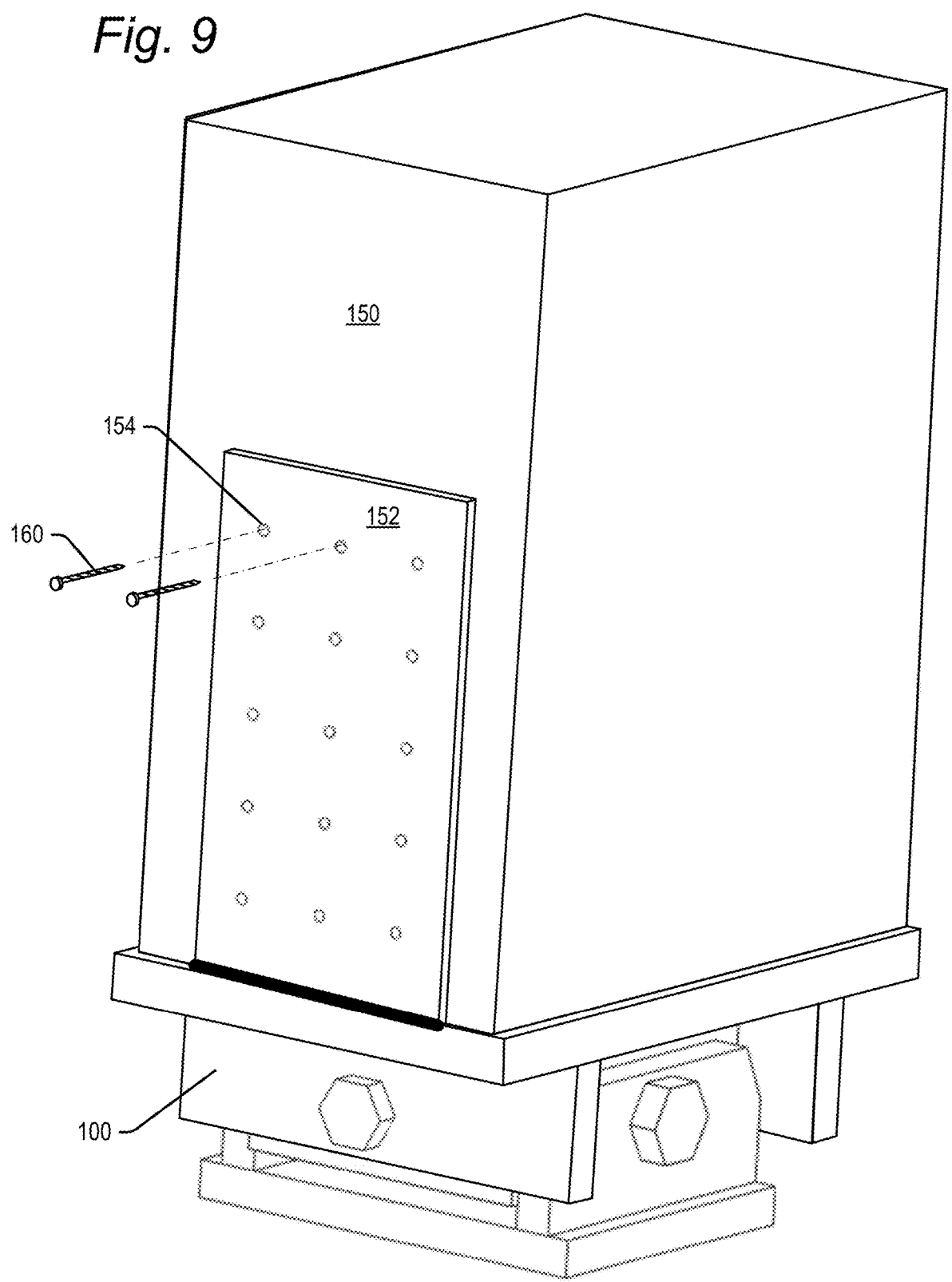
FIG. 9 depicts a perspective view of a structural member supported on a pinned connector in accordance with embodiments of the present technology.

FIG. 9 is a perspective view of a pinned connector 100 supporting a structural member 150. Only a bottom portion of structural member 150 is shown in FIG. 9. As noted above, structural member 150 may be a wooden column, but may be any of a wide variety of other structural elements used in light frame constructions. An interface of the structural member 150 may lie flat against top plate 132 of the column support plate 130 as shown in FIG. 9. Structural member 150 may be mounted to top plate 132 by a variety of schemes. In the embodiment shown in FIG. 9, two or more fastener plates 152 (one of which is shown in FIG. 9) may be welded at or near the edges of top plate 132 extending upward. The fastener plates 152 may be affixed to top plate 132 by a variety of other methods including bolting or by an epoxy.

Figure 10:
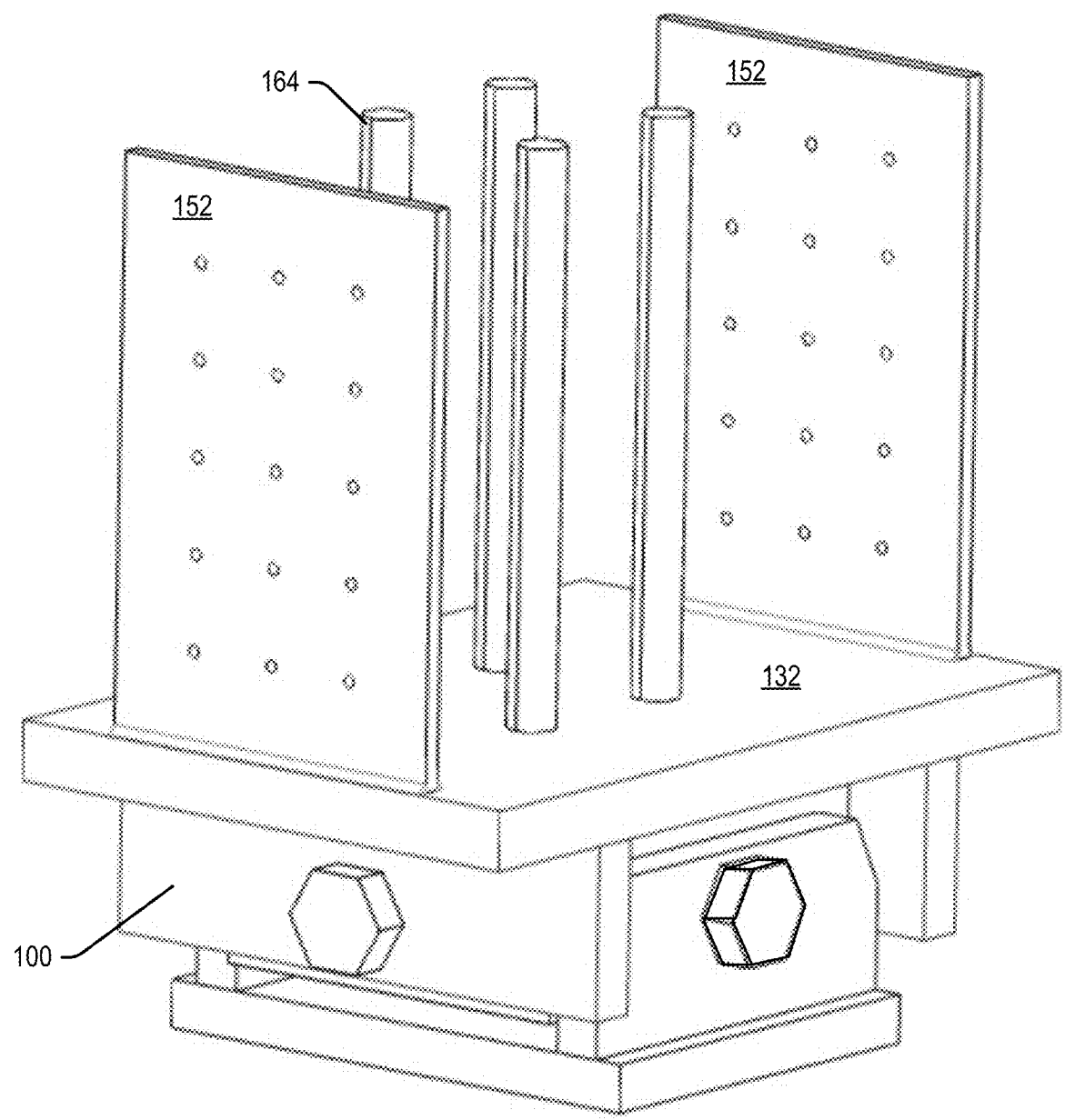
FIG. 10 depicts plates and rods for affixing the structural member to the pinned connector in accordance with embodiments of the present technology.

The fastener plates 152 may be positioned so as to be flush against lower side surfaces of the structural member 150. The fastener plates 152 may be formed with a pattern of holes 154, for receiving fasteners 160 (only two of which are shown in FIG. 9) to fasten the structural member 150 to the fastener plates 152 and pinned connector 100. The fasteners may be screws such as for example the ¼ inch diameter high-strength Strong-Drive SDS Connector screw from Simpson Strong-Tie, Pleasanton, Calif. Other types of fasteners may be used. The fasteners 160 may be inserted orthogonally to fastener plates 152, or at an angle, of for example of 45° with the tips angling upward. Other angles are possible. As shown in FIG. 10, fastener plates 152 may be provided for example on two opposed sides of top plate 132 and structural member 150. In further embodiments, fastener plates 152 may be provided around all four sides top plate 132 and structural member 150.

As noted, structural member 150 may be affixed to the pinned connector 100 by a variety of other fasteners. FIG. 10 also shows additional fasteners in the form of rods 164 protruding up from and upper surface of top plate 132. In practice, threaded holes may be made through the top plate 132. Holes may also be drilled in the column 150 and filled with epoxy. The structural member 150 may then be seated on the top plate 132, and the rods 164 may be threaded through the top plate and up into the drilled holes. Alternatively, the rods 164 may be threaded through the top plate first, and the structural member may then be lowered down onto the top plate 132, over rods 164. The epoxy hardens around the threads of the threaded rod and adheres to the wood so as to provide load transfer (primarily) in tension between the column and the threaded rods.

In further embodiments, the structural member 150 may be bolted to the top plate 132, using fastener plates 152 or rods 164. In a further embodiment, a knife plate may be used, inserted into a slot formed through the end face of structural member 150, into an interior of the structural member 150. Examples of knife plates that may be used are described for example in U.S. patent application Ser. No. 16/923,379, entitled, "Knife Plate Fastener," filed Jul. 8, 2020, which application is incorporated herein in its entirety.

It is conceivable that the top surface of top plate 132 may include recesses for receiving and portions of the fastener plates 152 or rods 164. While FIG. 10 shows both fastener plates 152 and rods 164, embodiments may use one or the other of fastener plates 152 and rods 164. The size of fastener plates 152 or rods 164 may depend on the size of the structural member 150, and the loads to be borne by structural member 150.

The pinned connector 100 allows pivoting of a structural member 150 mounted thereon with two degrees of freedom (provided by rotation about axes 128 and 148). These two degrees of freedom allow the structural member 150 to orbit 360° about a home axis, to potentially trace out a cone, with the apex at the pinned connector. The structural member 150 may trace out other shapes within that cone as the structural member rotates about axes 128 and/or 148. The home axis of the structural member 150 may be defined as the longitudinal axis of the structural member when the structural member is in its home position, unbiased by shear loads on the building. In embodiments where the structural member is a vertical column, this home axis may be vertical.

The orbiting of the structural member 150 permitted by connector 100 advantageously prevents transmission of moment, or rotational, forces between the foundation 112 (FIG. 1) and the structural member 150. At the same time, the pinned connector resists rotation about the home axis (i.e., rotation of the structural member about its longitudinal axis), and resists translation of the structural member 150 along three orthogonal axes. The size of the pinned connector 100, including each of its component parts, may be scaled up or down, depending on the size of structural members 150 and the loads to be carried by the structural members 150.

The pinned connector 100 prevents transmission of moment forces from the foundation to the structural member 150 upon shifting of the foundation for example during seismic activity. In addition to reducing moment forces on structural members 150, the pinned connector 100 may reduce moment forces on structural members such as beams to which the structural members 150 are connected. The pinned connector 100 also prevents transmission of moment forces from the structural member 150 to the foundation due for example to wind or snow creating shear forces on a building structure in which structural member 150 is used.

Figure 11:
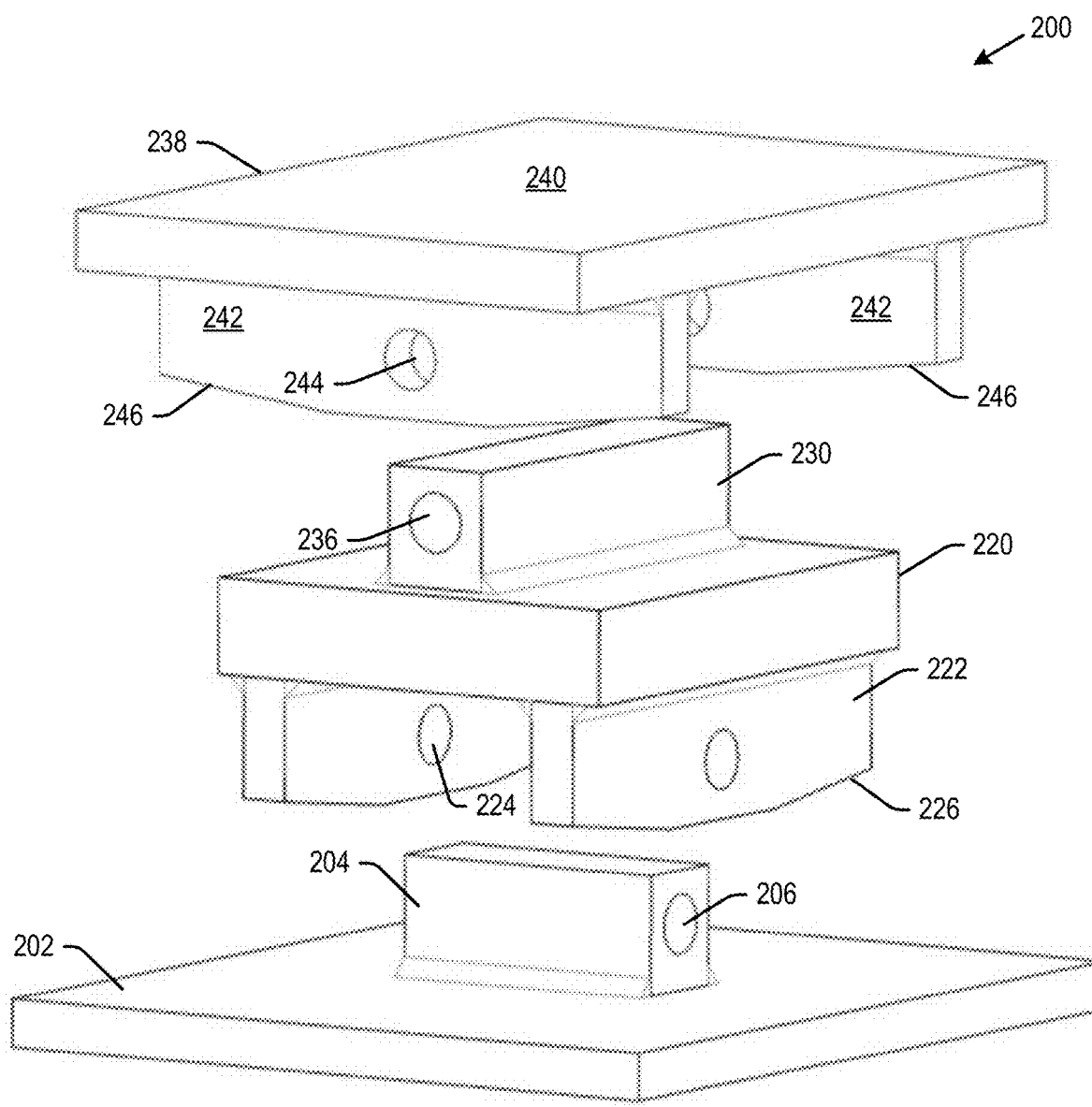
FIG. 11 depicts an exploded perspective view of a pinned connector in accordance with alternative embodiments of the present technology.

FIGS. 1-10 show one particular embodiment of a pinned connector 100. It is understood that variations may be made to each of baseplate 102, pivot block 120 and top plate 130 without departing from the spirit or scope of the present technology. For example, FIG. 11a shows a further embodiment of a pinned connector 200. Pinned connector 200 includes a baseplate 202 having a connector block 204. Each end of connector block 204 may include a mounting hole 206 (all the way through the connector block 204 or at opposed ends of connector block 204). The connector block 204 may be welded to baseplate 202. The connector block 204 may be otherwise connected to baseplate 202, or integrally formed with baseplate 202.

A pivot block 220 includes a pair of downwardly extending brackets 222 spaced apart from each other to fit over connector block 204 with a small clearance such as for example ¼" to ¹⁄₁₆", though that clearance may vary in further embodiments. Each of the brackets 222 may include mounting holes 224 aligned with each other and mounting holes 206. The brackets 222 of pivot block 220 may fit over connector block 204, and a pair of bolts (not shown), or one long bolt where mounting hole 206 extends all the way through connector block 204, may be used to rotationally affix pivot block 220 to the baseplate 202.

Bottom edges of brackets 222 may each include chamfers (angled sections) 226 at their front and rear ends. The angle of the chamfers 226 define the maximum rotational extent of the pivot block 220 with respect to baseplate 202.

Pivot block 220 may further include connector block 230 oriented orthogonally to connector block 204. Each end of connector block 230 may include a mounting hole 236 (all the way through the connector block 230 or at opposed ends of connector block 230). The brackets 222 and/or connector block 230 may be welded to pivot block 220. The brackets 222 and/or connector block 230 may be otherwise connected to pivot block 220, or integrally formed with pivot block 220.

A column support plate 238 includes a top plate 240, and a pair of downwardly extending brackets 242 extending from a bottom surface of top plate 240. The brackets 242 may be welded or otherwise affixed to top plate 240. The brackets 242 may be spaced apart from each other to fit over connector block 230 with a small clearance such as for example ¼" to ¹⁄₁₆", though that clearance may vary in further embodiments. Each of the brackets 242 may include mounting holes 244 aligned with each other and mounting holes 236. The brackets 242 of column support plate 238 may fit over connector block 230, and a pair of bolts (not shown), or one long bolt where mounting hole 236 extends all the way through connector block 230, may be used to rotationally affix the column support plate 238 to the pivot block 220.

Bottom edges of brackets 242 may each include chamfers 246 at their front and rear ends. The angle of the chamfers 246 define the maximum rotational extent of the column support plate 238 with respect to pivot block 220.

A structural member 150 may be mounted to top plate 240 as described above with respect to FIGS. 9 and 10. As with pinned connector 100, the pinned connector 200 advantageously prevents transmission of moment, or rotational, forces between the foundation 112 (FIG. 1) and a structural member 150 mounted on pinned connector 100.

Figure 12:
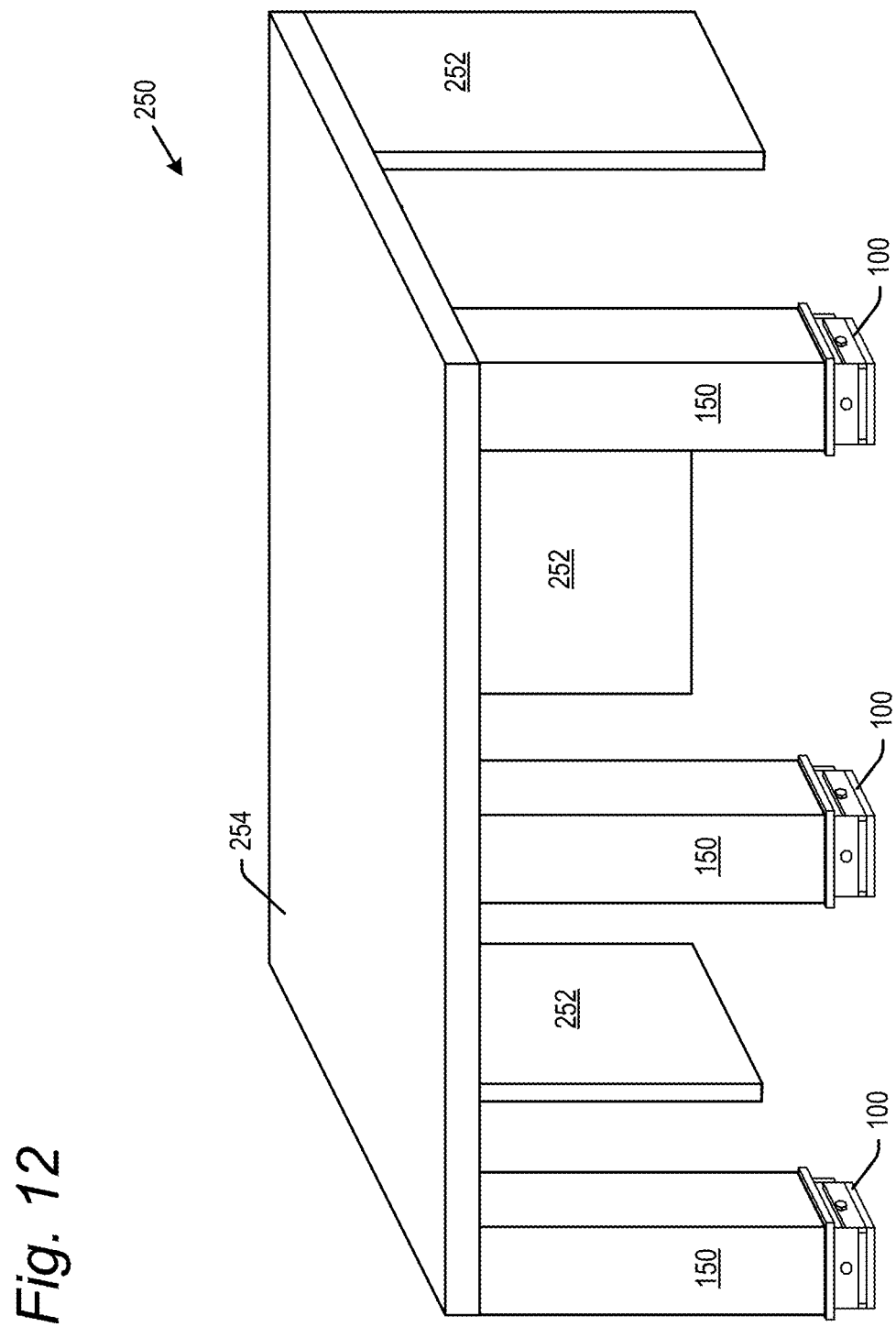
FIG. 12 depicts a perspective view of a single level construction including structural members supported on pinned connectors in accordance with embodiments of the present technology.

FIG. 12 is a perspective view of a building 250 including one or more structural members 150 affixed to a foundation 112 (not separately shown) using pinned connectors 100. As the one or more structural members 150 supported on pinned connector 100 are able to orbit 360° around a home axis perpendicular to the foundation 112, shear walls or other panels 252 may also be provided for lateral stability. The building includes a floor plate 254 supported on the one or more structural members 150 and panels 252. The structural members 150 and panels 252 may be affixed to the floor plate 254 as explained below.

The one or more structural members 150 on pinned connectors 100 absorb compressive loads due to the floor plate 254 (and possibly additional levels), as well as due to shear forces on building 250. The one or more structural members 150 on pinned connectors 100 also absorb tensile loads in the case of an updraft on the floor plate 254 in an area of the one or more structural members 150. However, the pinned connectors prevent transmission of moment forces by allowing a degree of orbiting of the structural members relative to the foundation 112 as explained above. The particular configuration of structural members 150 and panels 252 is by way of example only, and the number, shape and size of members 150 and panels 252 may vary in further examples.

Figure 13:
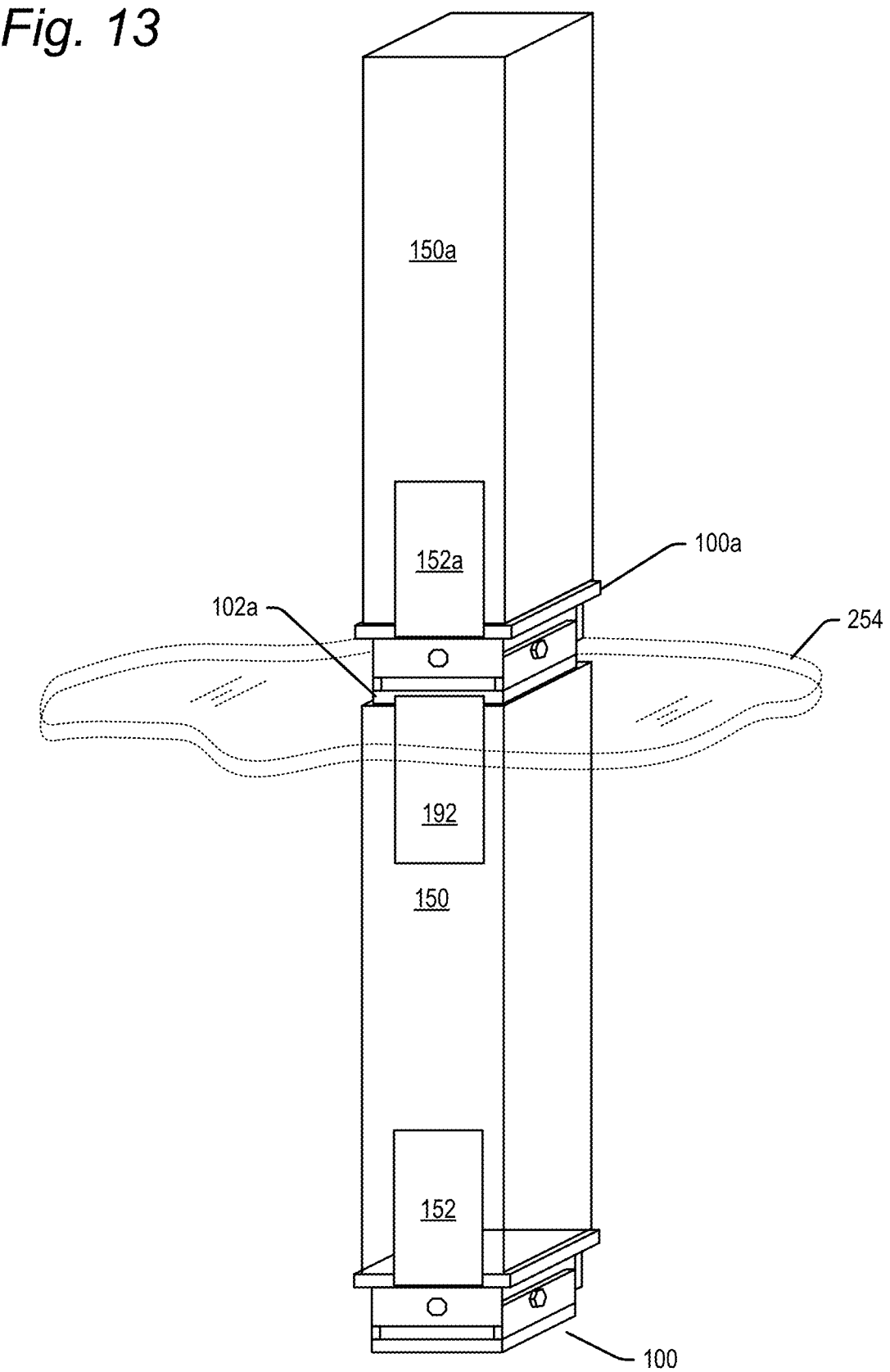
FIG. 13 depicts a perspective view of a structural member and pinned connector of a second level affixed to a structural member and pinned connector of a first level in accordance with embodiments of the present technology.

Referring now to the perspective view of FIG. 13, a structural member 150 may mount at its upper end to the floor plate 254 (a portion of which is shown in phantom). In embodiments, the structural member 150 may protrude through an opening in the floor plate 254, so that an upper surface of the structural member 150 is flush with an upper surface of the floor plate 254, though the top of the structural member 150 may be above or below the top surface of the floor plate 254 in further embodiments. In embodiments, beams (not shown) may be affixed to top portions of the structural member 150, and the floor plate 254 may be supported on the beams, as well as by panels 252. Other arrangements for supporting floor plate 254 are possible. As used herein, the term 'foundation,' may refer to foundation 112 on the first level, or any of the floor plates 254 of successive levels.

As is further shown in FIG. 13, in embodiments, a second pinned connector 100a and structural member 150a (for the second level) may be spliced together on top of a first structural member 150 mounted to a first pinned connector 100. The second pinned connector 100a may be mounted directly to lower structural member 150 as shown. For example, fastener plates 192 may be provided having an upper edge welded to the baseplate 102a of the second level connector 100a and extending downward, where the plates 192 may be fastened to the upper portion of structural member 150. The second pinned connector 100a may alternatively mount atop the floor plate 254. A structural member 150 having a pinned connector 100 at its base may be attached at a second level or higher to other components, such as beams or floor plates, using for example the fastener plates described above.

In the embodiment of FIG. 13, the lower structural member 150 may pivot on pinned connector 100 on the foundation 112, and the upper structural member 150a may pivot on the pinned connector 100a.

Figure 14:
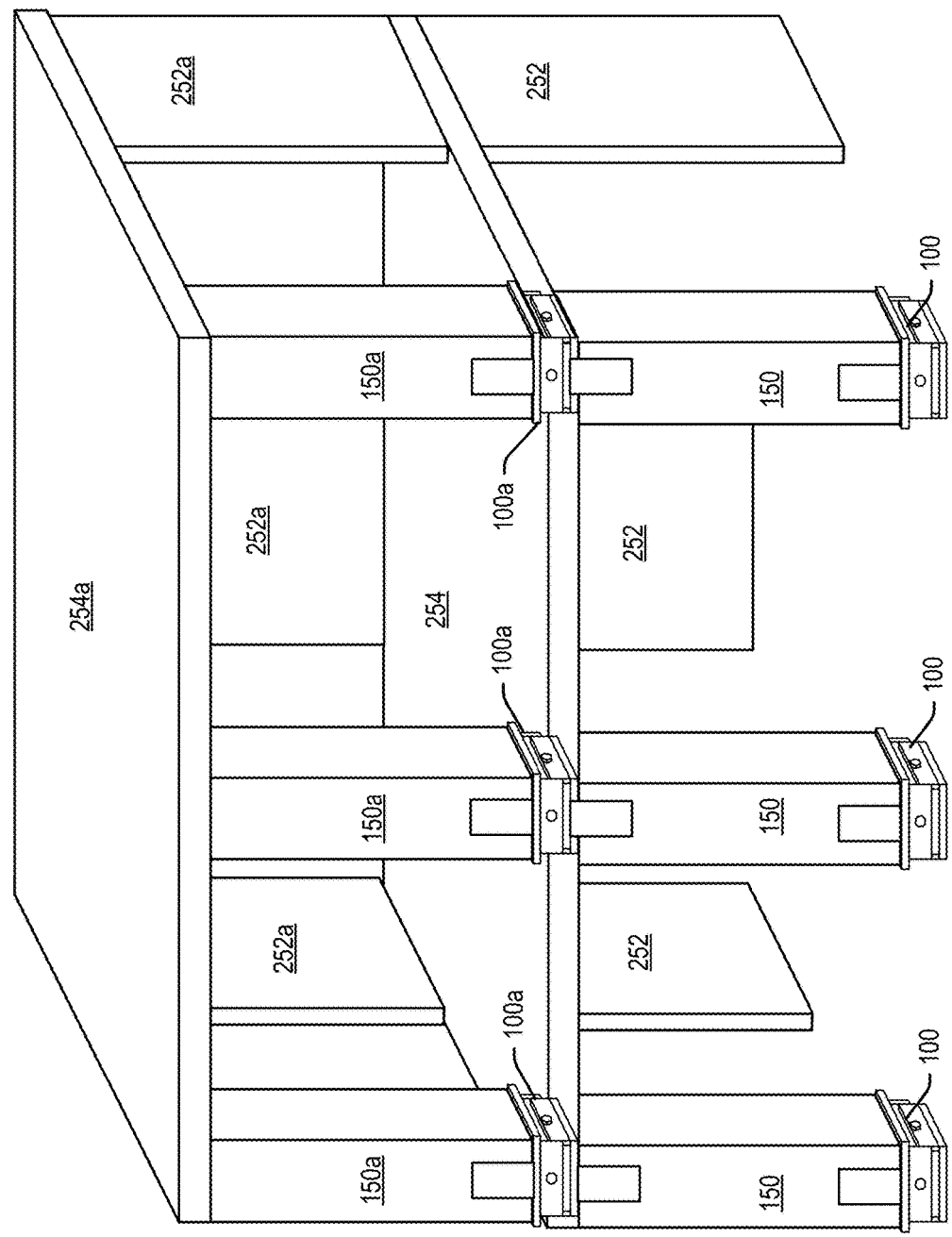
FIG. 14 depicts a perspective view of a two-level construction including structural members supported on pinned connectors in accordance with embodiments of the present technology.

FIG. 14 is a perspective view of building 250 including first and second levels. As described above, the one or more panels 252 and the one or more structural members 150 on pinned connectors 100 on the first level support the floor plate 254. FIG. 14 shows one or more panels 252a and one or more structural members 150a on pinned connectors 100a on the second level, supporting a third level floor plate 254a. As described with respect to FIG. 13, the structural members 150a and pinned connectors 100a may be spliced together directly on top of the structural members 150 of the first level.

It is understood that a number of additional levels may further be successively added to building 250 in the same manner. On each new level, a pinned connector 100n may be affixed on top of the structural member 150n-1 of the preceding level. Building 250 may for example have 10 levels, though there may be more or less levels than that in further embodiments. It is conceivable that some levels include pinned connectors 100n, while other levels do not. It is also conceivable that some structural members 150n on a level have pinned connectors 100n, while other structural members 150n on that level do not.

Embodiments described above relate to a pinned connector 100 allowing orbiting of a structural member 150 pinned to the connector 100. However, it may be desirable to fix the position of the column support plate 130 and structural member 150 relative to the baseplate 102 of the pinned connector 100, such as for example when erecting the building 250. In further embodiments, the pinned connector 100 may be used with orbital restraints which prevent pivoting of the column support plate 130 relative to the baseplate 102 about axis 128 and/or axis 148.

Figure 15:
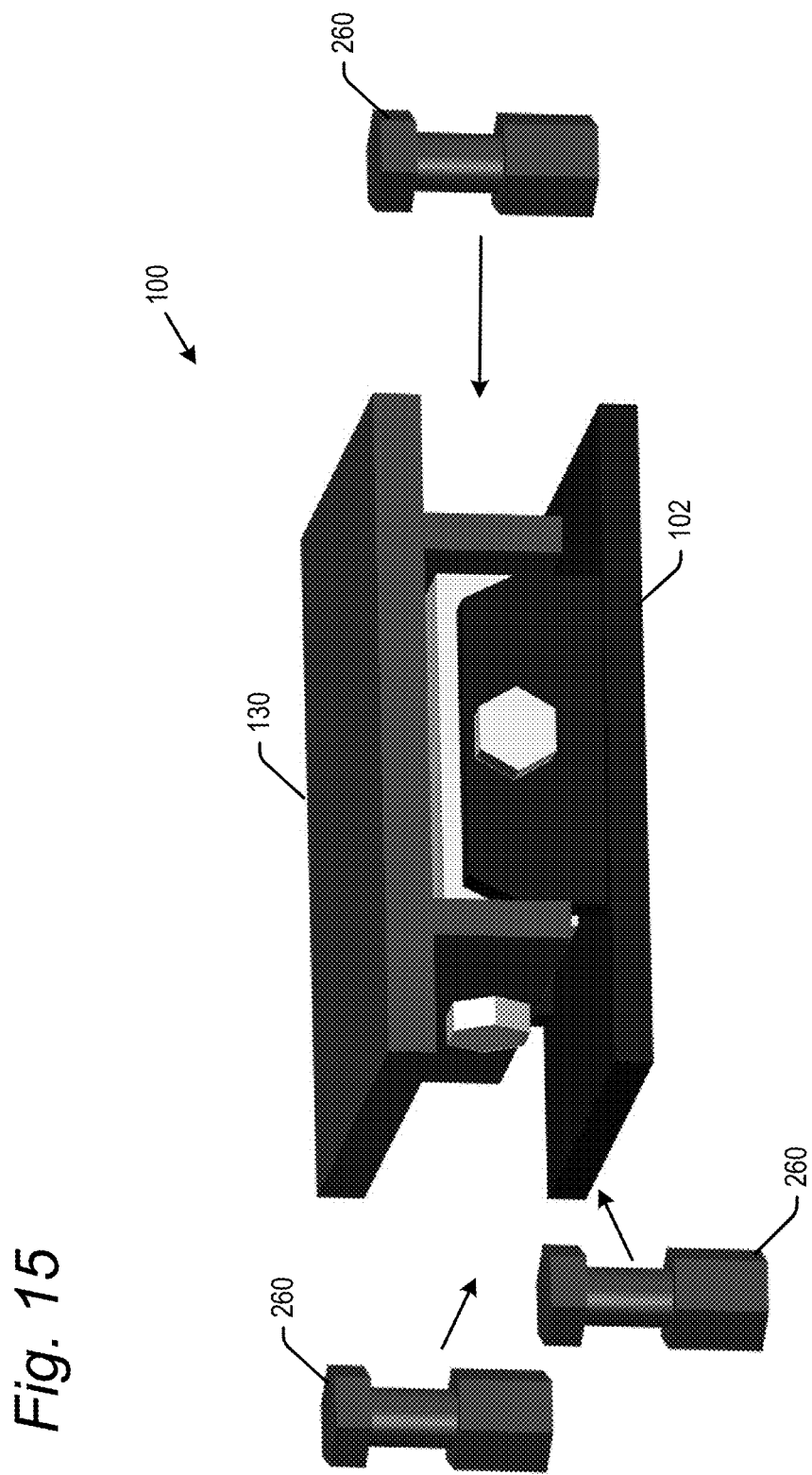
FIGS. 15-17 show perspective and edge views of a pinned connector including orbital restraints according to a further embodiment of the present technology.
Figure 16:
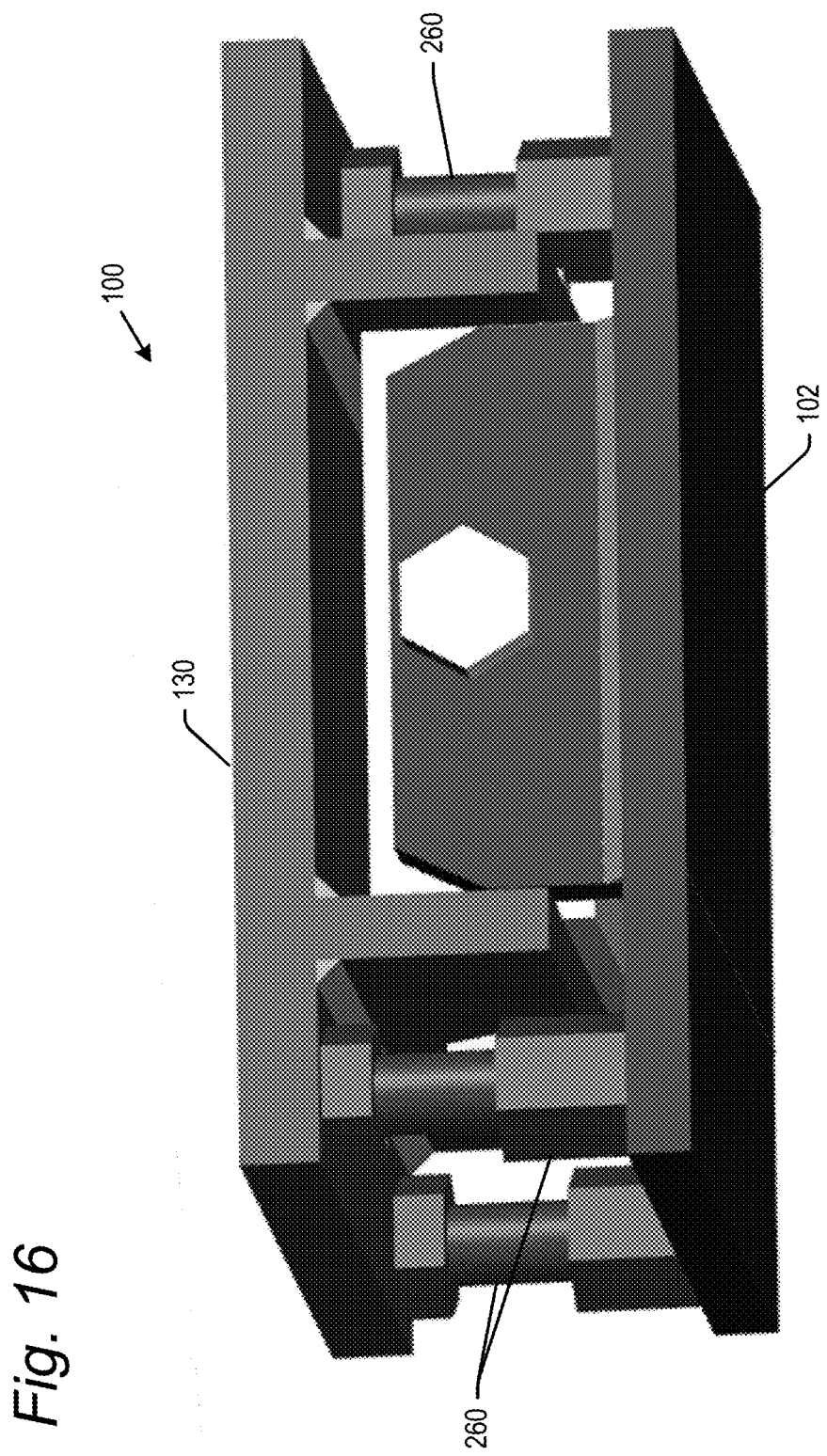
Figure 17:
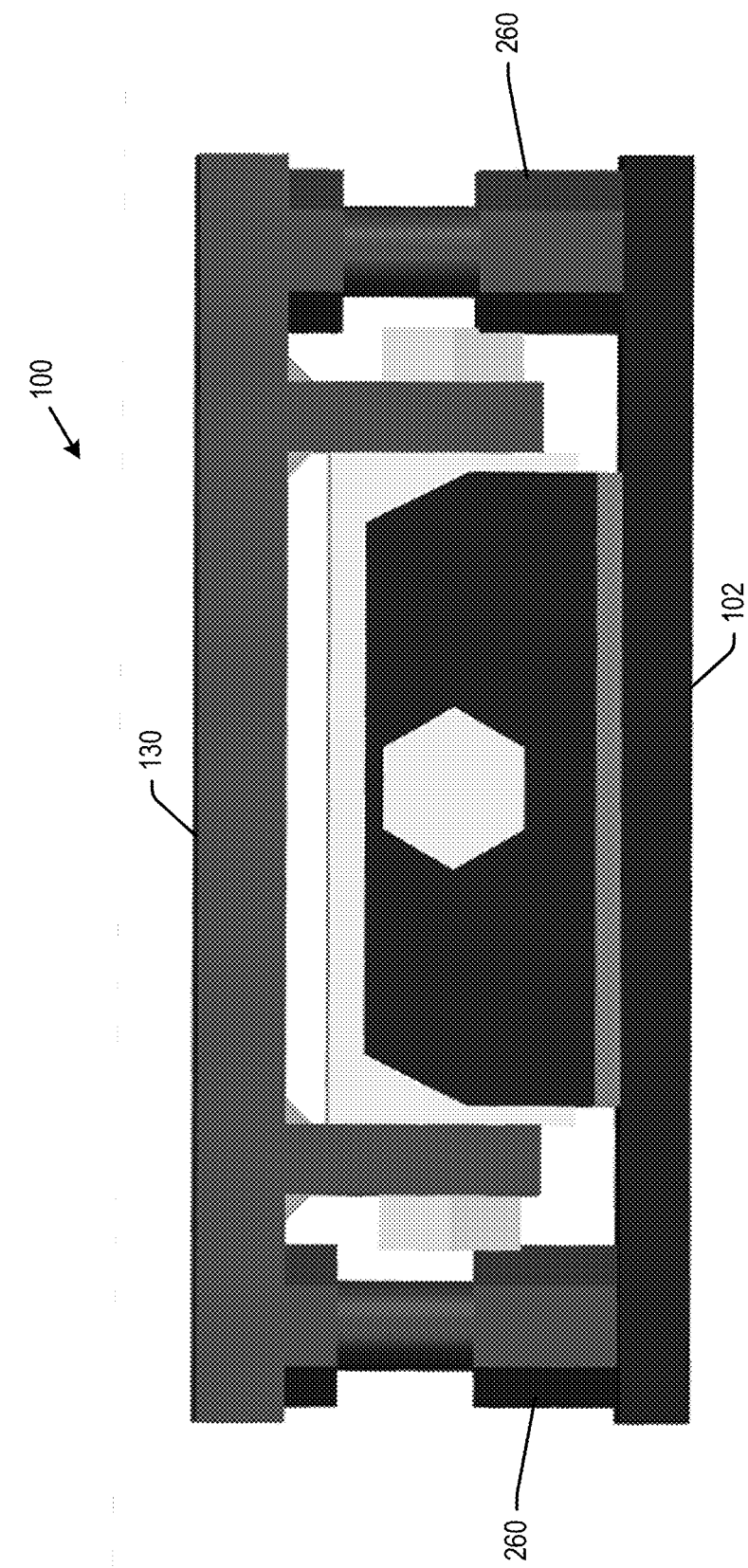

FIGS. 15-17 show one example of orbital restraints 260 for use with the pinned connector 100. The orbital restraints may be formed of steel or other material performing well in compression such as wood blocks, concrete or reinforced concrete. In one embodiment, all orbital restraints 260 may have the same height, and fit snugly in the space between the top plate 132 of column support plate 130 and the base 104 of the baseplate 102. Such an example would level the top plate 132 parallel to the base 104, and (assuming the baseplate 102 is mounted on a horizontal surface) would maintain structural member 150 in a vertical orientation and prevent orbiting. It is conceivable that the orbital restraints be different sizes, together fitting snugly between the top plate 132 and the base 104 to maintain the top plate 132 in a non-parallel relation to the base 104.

In the illustrated example, there are three orbital restraints 260, two on one side of pinned connector 100 and one on the opposed side of the pinned connector 100. Three such restraint points define a fixed plane of the structural support plate 130 relative to the baseplate 102. The orbital restraints 260 may be provided on other sides of the pinned connector 100 in further embodiments.

Moreover, there may be more than three orbital restraints 260 in further embodiments, such that the restraints 260 together prevent pivoting of the column support plate 130 about the axis 128 and/or axis 148. In further embodiments, an orbital restraint 260 may have a length that extends along a portion or an entire edge of the top plate 132 and the base 104.

In the illustrated example, the orbital restraints may each comprise a nut and bolt, such that the overall height of each orbital restraint 260 is adjustable. Using a leveling device on the top plate 132, the height of each orbital restraint 260 may be adjusted until the top plate 132 is horizontally level or in some other desired orientation relative to the base 102. In further embodiments, one or more of the orbital restraints 260 may have a fixed length. It is possible that some restraints 260 have a fixed height while others have a variable height.

In the illustrated example, the orbital restraints have a top wedged against the column support member 130 and a bottom wedged against the baseplate 102. In further embodiments, where for example the top plate 132 is larger than the base 104, one or more of the orbital restraints 260 may have a top wedged against the column support member 130 and a bottom wedged against the foundation 112, floor plate 254, or some other fixed surface.

In embodiments, the orbital restraints prevent pivoting of the column support plate 130 about both axes 128 and 148 to fix the position of the column support plate 130 and prevent any orbiting of the structural member 150. It is possible that the orbital restraints 260 prevent pivoting of the column support plate 130 about only one of axes 128 and 148, thus allowing the structural member 150 to pivot with a single degree of freedom. While a particular configuration of the orbital restraints 260 is shown and described above, it is understood that the orbital restraints 260 may be any of a wide variety of shapes and configurations to prevent pivoting of the column support plate 130 about axis 128 and/or axis 148.

For purposes of this document, a connection may be a direct connection or an indirect connection (e.g., via one or more other parts). In some cases, when an element is referred to as being connected, affixed or coupled to another element, the element may be directly connected to the other element or indirectly connected to the other element via intervening elements. When an element is referred to as being directly connected or affixed to another element, then there are no intervening elements between the element and the other element.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A system for securing a structural member to a foundation in a construction, comprising:
    a baseplate configured to be affixed to the foundation;
    a pivot block rotationally mounted to the baseplate for rotation about a first axis relative to the baseplate;
    a column support plate configured to support the structural member, the column support plate rotationally mounted to the pivot block for rotation about a second axis orthogonal to the first axis;
    a fastener configured to fasten the structural member to the column support plate; and
    one or more orbital restraints for limiting pivoting of the structural member about at least one of the first and second axes.

2. The system of claim 1, wherein the baseplate and pivot block are configured to limit rotation of the pivot block about the first axis relative to the baseplate.

3. The system of claim 1, wherein the pivot block and column support plate are configured to limit rotation of the column support plate about the second axis relative to the baseplate.

4. The system of claim 1, wherein the column support plate is configured to support a structural member made of natural wood.

5. The system of claim 1, wherein the column support plate is configured to support a structural member made of engineered lumber or metal.

6. The system of claim 1, wherein the baseplate comprises a base and a pair of brackets extending from the base, the pair of brackets comprising mounting holes configured to receive bolts to rotationally mount the pivot block to the baseplate.

7. The system of claim 6, wherein the brackets are affixed to the base by at least one of welding, bolting or gluing.

8. The system of claim 6, wherein contact of the pivot block with the base limits rotation of the pivot block relative to the base, and wherein the bolts space the pivot block above the base a predefined distance to control an amount of rotation of the pivot block relative to the baseplate to a predefined rotation.

9. The system of claim 1, wherein the column support plate comprises a top plate and a pair of brackets extending from the top plate, the pair of brackets comprising mounting holes configured to receive bolts to rotationally mount the column support plate to the pivot block.

10. The system of claim 9, wherein the brackets are affixed to the top plate by at least one of welding, bolting or gluing.

11. The system of claim 9, wherein contact of the top plate with the pivot block limits rotation of the column support plate relative to the pivot block, and wherein the bolts space the top plate above the pivot block a predefined distance to control an amount of rotation of the column support plate relative to the pivot block to a predefined rotation.

12. The system of claim 1, wherein the fastener is one of a fastener plate or a rod.

13. The system of claim 1, wherein the one or more orbital restraints are configured to be positioned between the baseplate and the column support plate.

14. The system of claim 13, wherein one or more heights of the one or more orbital restraints are adjustable.

15. A construction comprising one or more levels, the construction comprising:
    a panel on a level of the one or more levels, the panel providing lateral, tensile and compressive stability to the construction;
    a structural member;
    a pinned connector supporting the structural member on a foundation of the level, the pinned connector allowing orbiting of the structural member 360° about a home axis, the structural member and pinned connector providing tensile and compressive stability to the construction, wherein the pinned connector comprises
        a baseplate configured to be affixed to the foundation;
        a pivot block rotationally mounted to the baseplate for rotation about a first axis relative to the baseplate;
        a column support plate configured to support the structural member, the column support plate rotationally mounted to the pivot block for rotation about a second axis orthogonal to the first axis; and
        a fastener configured to fasten the structural member to the column support plate.

16. The construction of claim 15, wherein the baseplate comprises a base and a pair of brackets extending from the base, the pair of brackets comprising mounting holes configured to receive bolts to rotationally mount the pivot block to the baseplate.

17. The construction of claim 16, wherein contact of the pivot block with the base limits rotation of the pivot block relative to the base, and wherein the bolts space the pivot block above the base a predefined distance to control an amount of rotation of the pivot block relative to the baseplate to a predefined rotation.

18. The construction of claim 15, wherein the column support plate comprises a top plate and a pair of brackets extending from the top plate, the pair of brackets comprising mounting holes configured to receive bolts to rotationally mount the column support plate to the pivot block.

19. The construction of claim 18, wherein contact of the top plate with the pivot block limits rotation of the column support plate relative to the pivot block, and wherein the bolts space the top plate above the pivot block a predefined distance to control an amount of rotation of the column support plate relative to the pivot block to a predefined rotation.

20. A construction comprising multiple levels, the construction comprising:
    a first panel on a first level of the multiple levels, the first panel providing lateral, tensile and compressive stability to the construction;
    a first structural member on the first level;
    a first pinned connector supporting the first structural member on a first foundation of the first level, the first pinned connector allowing orbiting of the first structural member 360° about a home axis, the first structural member and first pinned connector providing tensile and compressive stability to the construction;

a second structural member on a second level of the multiple levels; and a second pinned connector affixed over the first structural member, the second pinned connector supporting the second structural member at or near a second foundation of the second level, the second pinned connector allowing orbiting of the second structural member 360° about a home axis, the second structural member and second pinned connector providing tensile and compressive stability to the construction;

wherein the first and second pinned connectors each comprises:

a baseplate configured to be affixed to the foundation;

a pivot block rotationally mounted to the baseplate for rotation about a first axis relative to the baseplate;

a column support plate configured to support the structural member, the column support plate rotationally mounted to the pivot block for rotation about a second axis orthogonal to the first axis; and a fastener configured to fasten the structural member to the column support plate.

\* \* \* \* \*